US007264643B2

(12) United States Patent
Williams et al.

(10) Patent No.: US 7,264,643 B2
(45) Date of Patent: Sep. 4, 2007

(54) ELECTRICAL CONNECTION FOR POROUS MATERIAL

(75) Inventors: Matthew Earnest Williams, East Peoria, IL (US); Matthew Thomas Kiser, Chillicothe, IL (US); Michael J. Pollard, Peoria, IL (US); Jo L. Costura, Peoria, IL (US); Cornelius Nicolae Opris, Peoria, IL (US); Hind M. Abi-Akar, Peoria, IL (US); Robert L. Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 578 days.

(21) Appl. No.: 10/902,290

(22) Filed: Jul. 30, 2004

(65) Prior Publication Data

US 2006/0021303 A1 Feb. 2, 2006

(51) Int. Cl.
*B01D 46/00* (2006.01)

(52) U.S. Cl. ...................... 55/282.3; 55/428.1; 55/524

(58) Field of Classification Search ............... 55/282.3, 55/385.3, 428.1, 491, 523, 524, 525, DIG. 30; 60/297, 311

See application file for complete search history.

(56) References Cited

U.S. PATENT DOCUMENTS

| | | | | |
|---|---|---|---|---|
| 3,308,958 | A | 3/1967 | Berger et al. | |
| 3,877,909 | A * | 4/1975 | Hansen | 55/487 |
| 4,316,360 | A * | 2/1982 | Liu et al. | 60/275 |
| 4,652,727 | A | 3/1987 | Hoshizaki et al. | |
| 5,238,473 | A * | 8/1993 | Femiani | 55/290 |
| 5,449,541 | A | 9/1995 | Lipp et al. | |
| 5,457,945 | A * | 10/1995 | Adiletta | 55/301 |
| 5,545,242 | A | 8/1996 | Whitlock et al. | |
| 5,803,991 | A | 9/1998 | Tsubouchi et al. | |
| 5,873,918 | A | 2/1999 | Dillman et al. | |
| 6,013,118 | A | 1/2000 | Matsunuma et al. | |
| 6,063,150 | A | 5/2000 | Peter et al. | |
| 6,564,768 | B2 * | 5/2003 | Bauer et al. | 123/198 E |
| 6,572,682 | B2 | 6/2003 | Peter et al. | |
| 2003/0196419 | A1 * | 10/2003 | Peter et al. | 55/282.3 |
| 2004/0031748 | A1 | 2/2004 | Kochert et al. | |
| 2005/0139075 | A1 * | 6/2005 | Iyer et al. | 95/278 |

* cited by examiner

*Primary Examiner*—Frank M. Lawrence
(74) *Attorney, Agent, or Firm*—Finnegan, Henderson, Farabow, Garrett & Dunner

(57) ABSTRACT

An electrical connection element for providing an electrical connection to a porous material may include a first electrically conductive plate disposed on at least a portion of a first side of the porous material. A second electrically conductive plate may be disposed on at least a portion of a second side of the porous material, opposite to the first side. An electrically conductive material may impregnate the porous material in a region between the first and second electrically conductive plates, and an electrical connector may be attached to at least one of the first and second electrically conductive plates.

21 Claims, 4 Drawing Sheets

ELECTRICAL CONNECTION FOR POROUS MATERIAL

TECHNICAL FIELD

The present disclosure is directed to an electrical connection for a porous material and, more particularly, to an electrical connection for use with a particulate filter in an exhaust system.

BACKGROUND

Internal combustion engines, including diesel engines, gasoline engines, natural gas engines, and other engines known in the art, may exhaust a complex mixture of air pollutants. The air pollutants may be composed of gaseous compounds and solid particulate matter, which may include unburned carbon particles called soot.

Due to increased attention on the environment, exhaust emission standards have become more stringent and the amount of particulates emitted from an engine may be regulated depending on the type of engine, size of engine, and/or class of engine. One method that has been implemented by engine manufacturers to comply with the regulation of particulate matter exhausted to the environment has been to remove the particulate matter from the exhaust flow of an engine using a particulate trap. A particulate trap is a filter designed to trap particulate matter in, for example, a mesh filtering media. During operation, the mesh filtering media of the particulate trap may saturate and clog with particulate matter. As a result, an undesirable exhaust system back pressure may develop.

To minimize or prevent exhaust system back pressure, the particulate trap may be subjected to a regeneration process in which some, most, or all of the trapped particulate matter may be removed from the filter. In one regeneration technique, an electric current may be passed through the mesh filtering media, which may include a metal, for example. In response to this current, the temperature of the filter may rise due to resistive heating. Ultimately, the temperature may be raised above the combustion temperature of the trapped particulate matter, and the particulate matter may be burned away from the filter.

Establishing a suitable electrical connection to the mesh of the particulate trap can be challenging. Particularly, the joint between the filter media and an electrical connector, which provides the current for regeneration, may be exposed to a harsh environment within the exhaust system. In this environment, the high temperatures and presence of corrosive compounds in the exhaust stream can promote corrosion and oxidation of the joint. Further, oxidation at the joint may even be facilitated by the porous nature of the filter media.

Oxidation of the joint and the surrounding mesh filter media can lead to the development of various oxide materials at the joint that can cause an increase in electrical resistance at the joint. As a result of the higher electrical resistance, there may be a disproportionate amount of localized heating occurring in the area of the joint. The mesh filter material can melt, which can further increase the resistance at the joint. Ultimately, an open circuit condition may result, which would prevent the flow of current to the filter media and, therefore, eliminate the capability of regeneration of the filter media through resistive heating. Thus, there is a need for an electrical connection to the filter of a particulate trap that can withstand the harsh environment within an exhaust system.

At least one method for forming a joint with a mesh filter media is disclosed in U.S. Patent Application Publication No. US 2004/0031748 ("the 748 patent publication") to Kochert et al. The '748 patent publication describes a process of forming a joint between a filter medium and a supporting structure by welding the filter medium to the supporting structure.

Although the joint described in the '748 patent publication may be suitable for use in certain exhaust system applications, this type of joint may have several shortcomings. For example, the welding technique may require temperatures high enough to damage the mesh material. Melting of the mesh during the welding process may have the effect of severing conductive elements of the mesh, which could lead to increased electrical resistance at the joint. Thus, the welding process of the '748 patent publication may be unsuitable for forming an electrical connection to a filter media.

The present disclosure is directed to overcoming one or more of the problems of the prior art steam oxidation technique.

SUMMARY OF THE INVENTION

One aspect of the present disclosure includes an electrical connection element for providing an electrical connection to a porous material. A first electrically conductive plate may be disposed on at least a portion of a first side of the porous material. A second electrically conductive plate may be disposed on at least a portion of a second side of the porous material, opposite to the first side. An electrically conductive material may impregnate the porous material in a region between the first and second electrically conductive plates, and an electrical connector may be attached to at least one of the first and second electrically conductive plates.

Another aspect of the present disclosure includes a particulate trap for an exhaust system. The particulate trap may include a housing and a mesh filter disposed within the housing. At least one electrical connection element may be in electrical communication with the mesh filter. The at least one electrical connection element may include a first electrically conductive plate disposed on at least a portion of a first side of the mesh filter, and a second electrically conductive plate disposed on at least a portion of a second side of the mesh filter, opposite to the first side. An electrically conductive material may impregnate the mesh filter in a region between the first and second electrically conductive plates. An electrical connector may be attached to at least one of the first and second electrically conductive plates.

Another aspect of the disclosure includes a method of providing an electrical connection to a porous material. The method may include disposing a brazing element on at least a portion of the porous material. At least a portion of the porous material and the brazing element may be disposed between a first conductive plate and a second conductive plate. The at least a portion of the porous material and the brazing element may be compressed between the first and second conductive plates. An electrical connector may be attached to at least one of the first and second conductive plates, and the brazing element may be melted such that at least some of the brazing element impregnates the porous material.

DETAILED DESCRIPTION

Figure 1:
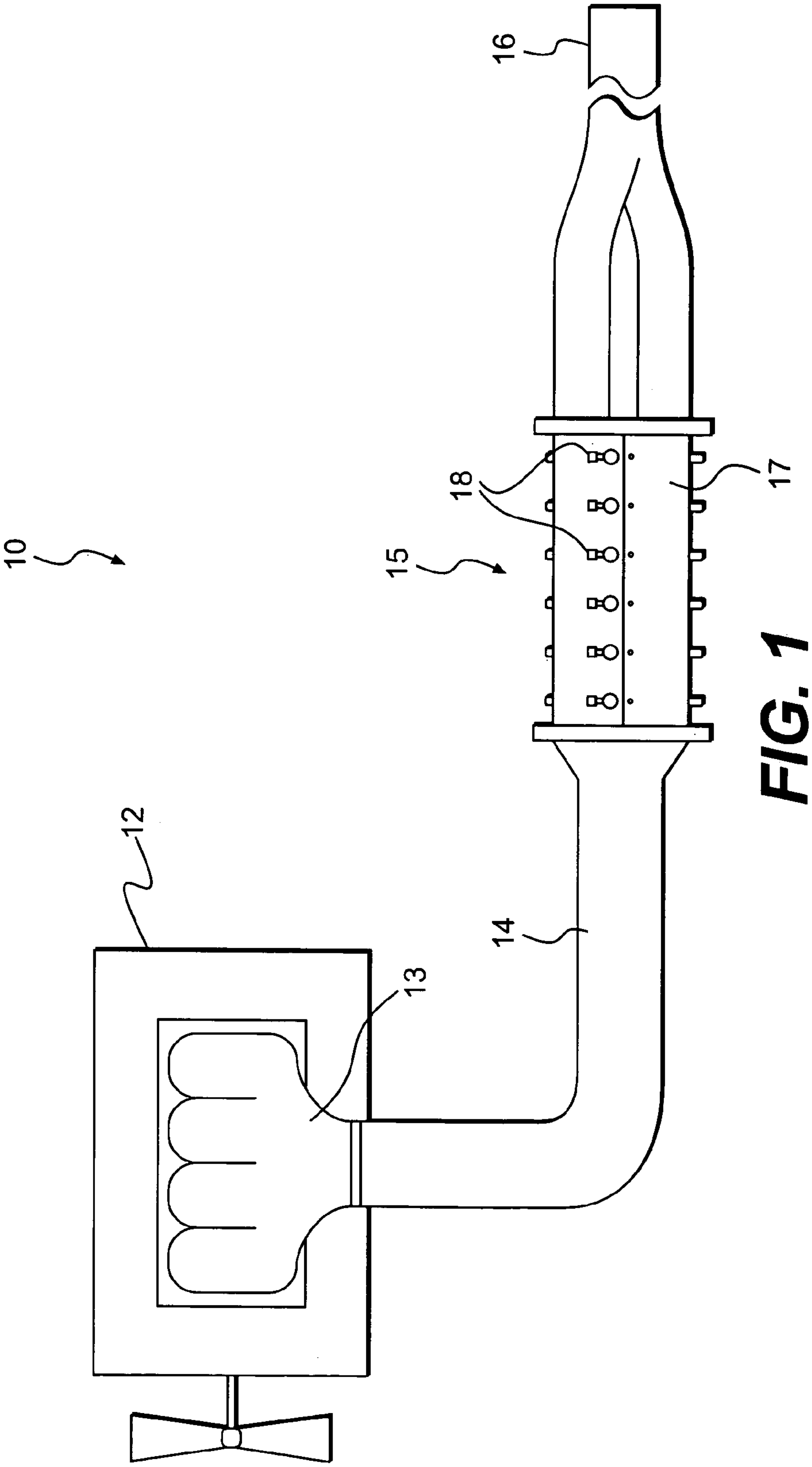
FIG. 1 is a schematic illustration of an exemplary exhaust system according to a disclosed embodiment.

FIG. 1 provides a schematic representation of an exhaust system 10. Exhaust system 10 may include a power source 12, an exhaust manifold 13, an exhaust conduit 14, a particulate trap 15, and an exhaust outlet 16. Power source 12 may be any source of power that generates an exhaust stream and may include a diesel engine, gasoline engine, natural gas engine, and any other engine known in the art. Exhaust from power source 12 may be expelled through exhaust manifold 13 and carried by exhaust conduit 14. Particulate matter present in the exhaust stream may be filtered out of the exhaust stream by filtering media present within particulate trap 15. The filtered exhaust exits particulate trap 15 and flows out of exhaust system 10 through exhaust outlet 16.

Particulate trap 15 may be configured in a variety of ways. In one exemplary embodiment, particulate trap 15 includes a housing 17 and a porous material disposed within housing 17. In one embodiment, the porous material includes a mesh filtering media 20 (FIG. 2) disposed within housing 17 for filtering particulate matter from an exhaust stream. Filtering media 20 may include any structure suitable for capturing particulate matter and may include any material suitable for enduring exposure to the environment within exhaust system 10. In one embodiment, filtering media 20 includes a porous mat. In another embodiment, filtering media 20 may include a wire mesh arranged in a layered structure where each layer may offer a different mesh density. Filtering media 20 may include at least one of an oxidation resistant metal-based material, a ceramic material, an iron-based material, stainless steel, or any other suitable material known in the art.

To facilitate regeneration of filtering media 20, particulate trap 17 may include one or more electrical connection elements 18 that extend through housing 17 and provide a means for establishing an electrical connection between filtering media 20 and a source of electrical current (not shown) located external to particulate filter 15. While in certain applications, a single electrical connection element 18 may be sufficient for supplying regeneration current to filtering media 20, particulate trap 15 may include a plurality of connection elements 18 to distribute the regeneration current over filtering media 20.

Figure 2:
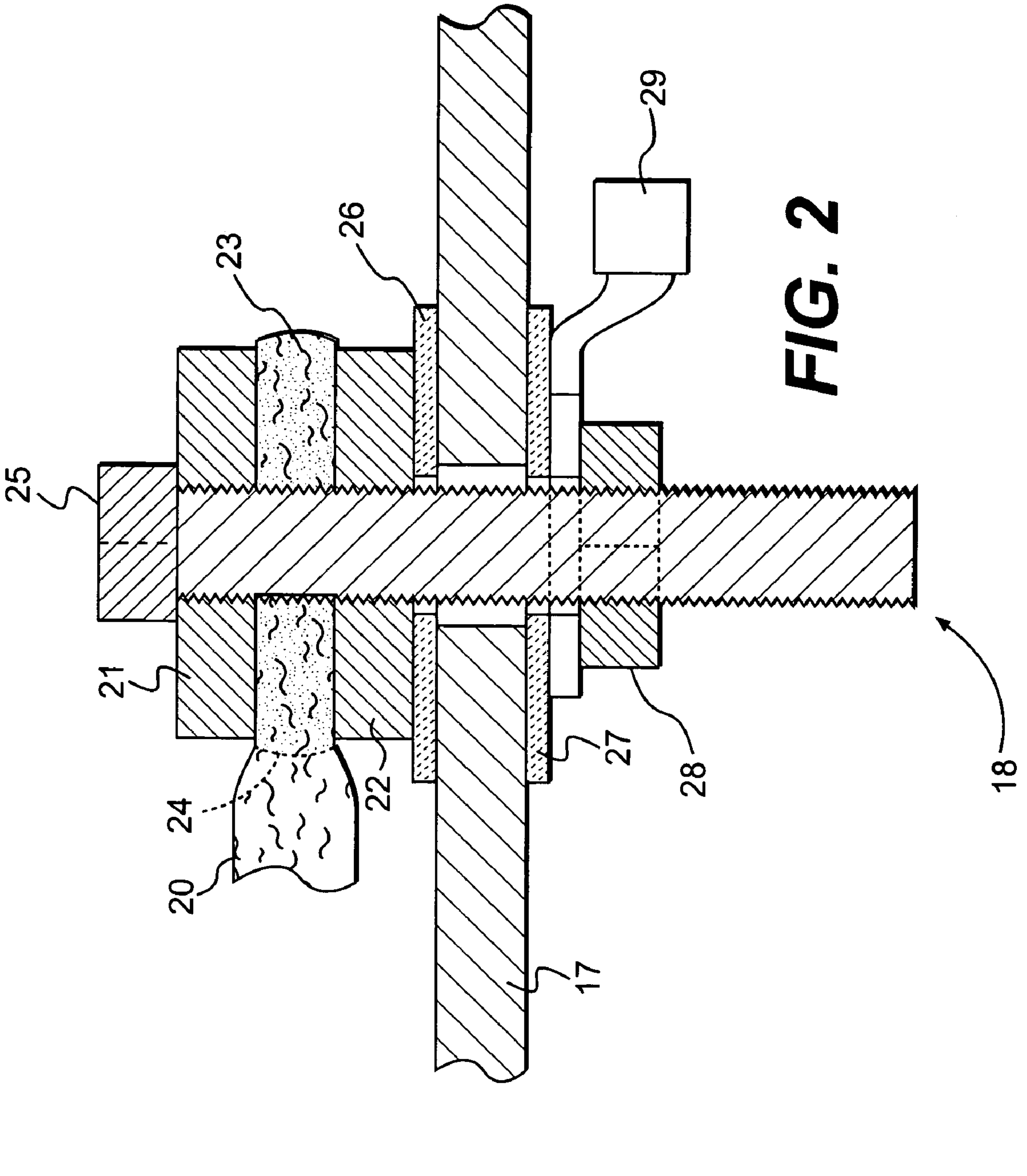
FIG. 2 is a schematic, partial cross-sectional view of an electrical connection element according to an exemplary disclosed embodiment.

FIG. 2 provides a schematic, partial cross-sectional view of a single electrical connection element 18 according to an exemplary embodiment. Electrical connection element 18 may include a first electrically conductive plate 21 and a second electrically conductive plate 22. These plates may be configured to contact and compress a portion of filtering media 20, as shown in FIG. 2. Plates 21 and 22 may be made from any suitable material for establishing an electrical connection with filtering media 20. In one embodiment, plates 21 and 22 may include stainless steel. Plates 21 and 22 may also be configured in a bus bar arrangement, such that plates 21 and 22 form part of a plurality of connection elements 18 in particulate trap 15.

Electrical connection element 18 may include an electrically conductive material 23 disposed in filtering media 20. Electrically conductive material 23 may impregnate at least some, and possibly all, of the pores of filtering media 20 in a region between the first and second electrically conductive plates 21 and 22. Particularly, the region between plates 21 and 22 impregnated by electrically conductive material 23 may constitute less than, equal to, or more than the total volume contained between plates 21 and 22. Further, an impregnation boundary 24 may be present in filtering media 20. Beyond boundary 24, little or none of electrically conductive material 23 may be included in filtering media 20. The location of boundary 24 may vary according to a particular application. In one embodiment, however, boundary 24 may be located near an edge of either or both of electrically conductive plates 21 and 22.

Electrically conductive material 23 may include any material suitable for establishing an electrical connection between plates 21 and 22 and filtering media 20. Electrically conductive material 23 may also include constituents that demonstrate at least some resistance to the corrosive environment that may be present within exhaust system 10. In one embodiment, electrically conductive material may include nickel. Particularly, electrically conductive material 23 may include a BNi-5a nickel compound. Other compounds including aluminum, silver, stainless steel, iron, copper, and any other conductive material may also be appropriate in certain applications.

Electrically conductive material 23 may include a brazed material provided, for example, by using a brazing preform-material, melting the preform, and allowing the brazing material to flow into filtering media 20. Electrically conductive material 23 may also include a sintered material formed by heating a powder material packed within filtering media 20. These processes will be discussed in detail below.

Electrical connection element 18 may also include an electrical connector 25 attached to at least one of electrically conductive plates 21 and 22. In one embodiment, electrical connector 25 may include a threaded fastener configured to engage threads on at least one of conductive plates 21 and 22. For example, electrical connector 25 may include a bolt. Electrical connector 25 may extend through the conductive plate 21, filtering media 20, and conductive plate 22. Using threads included on at least one of conductive plates 21 and 22, electrical connector 25 may be used to hold conductive plate 21, the region of filtering media 20 between the conductive plates 21 and 22, and conductive plate 22 in compression. By compressing filtering media 20 in this region, the amount of porosity within filtering media 20 in this region may be reduced.

Electrical connector 25 may be configured to extend beyond conductive plate 22. In one exemplary embodiment, electrical connector 25 may extend through housing 17 of particulate trap 15. In this way, electrical connector 25 may be used as a means for supplying regeneration current to filtering media 20 from a current source (not shown) external to particulate trap 15. In this embodiment, electrical separators 26 and 27 may be included to electrically isolate electrical connector 25 and conductive plate 22 from housing 17. Electrical separators 26 and 27 may include any suitable electrically insulating material. In one embodiment, electrical separators 26 and 27 may include ceramic washers. A nut 28 may be included in electrical connection element 18 for securing electrical connector 25, conductive plates 21 and 22, filtering media 20, and electrical separators 26 and 27 to housing 17. Additionally, electrical connection element 18 may include a terminal 29 attached to electrical connector 25. Terminal 29 may include any suitable structure for receiving and attaching to a conductor of electric current (e.g., a wire). In one embodiment, terminal 29 may include a soldering terminal.

Figure 3:
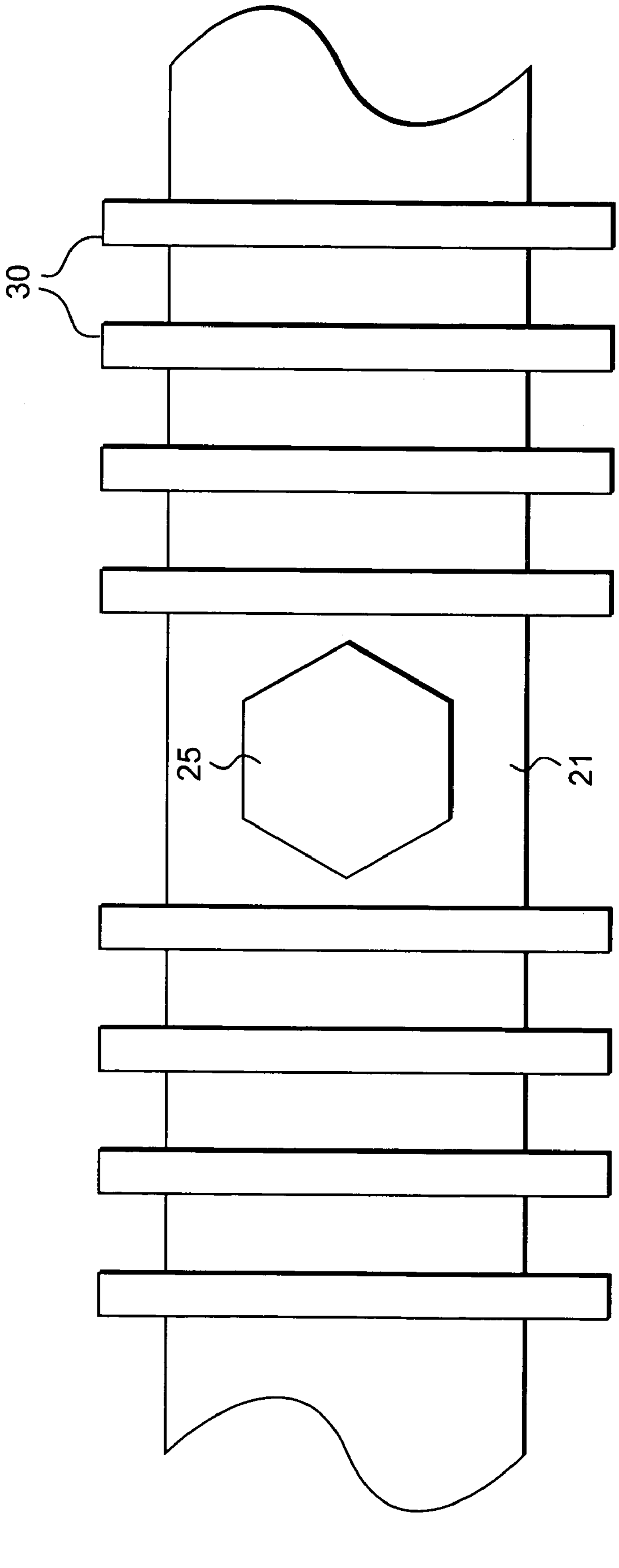
FIG. 3 is a schematic illustration of a conductive plate according to an exemplary disclosed embodiment.

FIG. 3 provides a schematic illustration of an exemplary embodiment in which conductive plate 21 includes structure to promote heat transfer away from the region of filtering media 20 included between conductive plate 21 and conductive plate 22. Specifically, conductive plate 21 may include cooling structures, such as cooling fins 30. It should be noted that either or both of conductive plates 21 and 22, or any other appropriate structure in electrical connection element 18, may include similar structures for promoting the transfer of heat away from electrical connection element 18.

Figure 4:
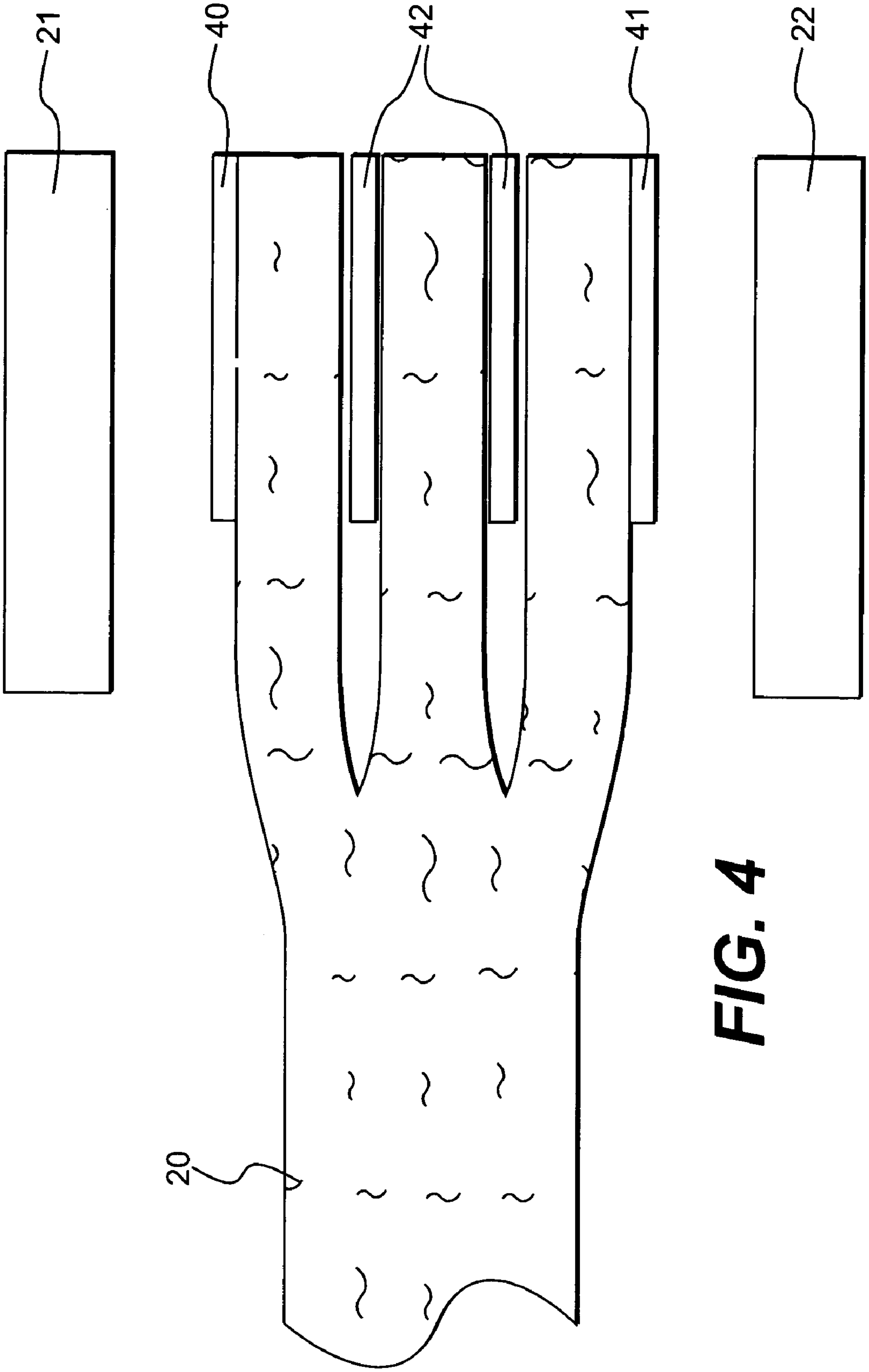
FIG. 4 is a schematic, partially exploded view of components of an exemplary electrical connection element.

Exemplary methods for establishing an electrical connection to filtering media 20 will now be described. In one exemplary method, a brazing element preform, such as a brazing wire, paste, or foil, may be disposed on at least a portion of filtering media 20. For example, as shown in FIG. 4, a brazing preform 40 may be placed between filtering media 20 and conductive plate 21. Another brazing preform 41 may be placed between filtering media 20 and conductive plate 22. In an embodiment where filtering media 20 includes a layered structure, one or more brazing preforms 42 may be placed between the various layers of filtering media 20. Brazing preforms 40, 41, and 42 may comprise any suitable electrically conductive material. In one embodiment, however, brazing preforms 40, 41, and 42 may include nickel.

Once brazing preforms 40, 41, and/or 42 have been located at desired positions on filtering media 20, the brazing preforms and a portion of filtering media 20 may be compressed between conductive plates 21 and 22. An electrical connector may be attached to at least one of conductive plates 21 and 22. While the electrical connector described may include any structure for facilitating an electrical connection to conductive plate 21 or 22 (e.g., a soldering terminal, a soldering post, a mechanical terminal, or any other connection device known in the art), in one embodiment, the electrical connector may correspond to electrical connector 25 shown in FIG. 3. Electrical connector 25, which may include a bolt, may enable compression of filtering media 20 and conductive plates 21 and 22 (e.g., by tightening electrical connector 25 using threads disposed in conductive plate 22) and also provide a suitable means for establishing an electrical connection to conductive plate 21 and/or 22. It should be noted that the steps of compressing filtering media 20 and attaching an electrical connector to at least one of conductive plates 21 and 22 may not be required for all applications and may be performed in any order.

To provide electrically conductive material 23 between conductive plates 21 and 22, the brazing elements may be heated and melted. As a result, the melted brazing material may flow into and impregnate pores within filtering media 20. Upon hardening, electrically conductive material may contact and bond together conductive plate 21, filtering media 20, conductive plate 22, and connector 25.

Electrically conductive material 23 may also be formed by sintering. For example, in the region between conductive plates 21 and 22, filtering media 20 may be packed with an electrically conductive powder. This powder may include at least one of nickel, aluminum, copper, iron, tungsten, silicon carbide, cobalt, and titanium. For purposes of this application, the phrase "at least one of" followed by a list of materials is intended to mean that the electrically conductive material may include: only a single selected member from the list of materials, two or more selected members from the list of materials, or all of the members of the list of materials. The powder-packed filtering media may be compressed between conductive plates 21 and 22. In one embodiment, electrical connector 25 may be used to contact conductive plate 21 and/or 22 and may also be used to compress filtering media 20 by, for example, tightening electrical connector 25 into threads in at least one of conductive plates 21 and 22. The electrically conductive powder may be heated and sintered to form electrically conductive material 23 that bonds to electrical connector 25 and at least a portion filtering media 20.

Electrically conductive material 23 may also be formed by flowing a molten material, such as a metal, into a portion of filtering media 20. Filtering media 20 may be placed into an electrically conductive compressive fixture, which may include, for example, conductive plate 21, conductive plate 22, and/or electrical connector 25. The molten material may be flowed into filtering media 20 by dipping filtering media 20 into a reservoir of molten material, by pouring molten material into filtering media 20, or by any other appropriate method for introducing molten material into filtering media 20. The molten material may include at least one of nickel, aluminum, copper, iron, tungsten, titanium or any other suitable, electrically conductive material. Electrically conductive material 23 may be formed by allowing the introduced molten material to harden.

An electrical connector may be attached to the compressive fixture before or after forming electrically conductive material 23. In one embodiment, electrical connector 25 in the form of a bolt may be attached to conductive plates 21 and 22 prior to forming electrically conductive material 23. Upon hardening, the molten material may form electrically conductive material 23, which may form a solid joint between conductive plates 21 and 22, filtering media 20, and electrical connector 25.

INDUSTRIAL APPLICABILITY

The disclosed electrical connection may be used in any application that may benefit from an electrical connection to a porous material. The electrical connection may be used, for example, in applications that may be exposed to harsh operating conditions. The use of nickel and/or other corrosion and oxidation resistant materials in the electrical connection may provide corrosion and oxidation resistance to the electrical connection even when exposed to the corrosive, high temperature environment of exhaust system 10. Also, a reduction in porosity of the porous material (e.g., a filtering mesh media or any other porous material) in a region associated with the electrical connection may further increase the resistance of the electrical connection to corrosion and oxidation. This porosity may be reduced by compressing the porous material and/or by impregnating the porous material with electrically conductive material 23.

The techniques used to form the disclosed electrical connection may help preserve the structural integrity of the porous material. Particularly, unlike welding, which may include high processing temperatures and can damage the porous material, the disclosed processes for impregnating filtering media 20 with electrically conductive material 23 (e.g., brazing, sintering, and flowing molten material) may result in less damage to filtering media 20. Less damage to the electrically conductive elements of filtering media 20 may promote uniform resistivity values over filtering media 20. As a result, filtering media 20 may be uniformly heated during a regeneration event. Further, disproportionate heating of the region around the electrical connection to filtering media 20 may be minimized or avoided.

It will be apparent to those skilled in the art that various modifications and variations can be made in the disclosed electrical connection element without departing from the scope of the disclosure. Additionally, other embodiments of the disclosed electrical connection element will be apparent to those skilled in the art from consideration of the specification. It is intended that the specification and examples be considered as exemplary only, with a true scope of the disclosure being indicated by the following claims and their equivalents.

The invention claimed is:

1. An electrical connection element for providing an electrical connection to a porous material, comprising:

a first electrically conductive plate disposed on at least a portion of a first side of the porous material;

a second electrically conductive plate disposed on at least a portion of a second side of the porous material, opposite to the first side;

an electrically conductive material impregnating the porous material in a region between the first and second electrically conductive plates; and an electrical connector attached to at least one of the first and second electrically conductive plates.

2. The electrical connection element of claim 1, wherein the electrically conductive material includes nickel.

3. The electrical connection element of claim 1, wherein the electrically conductive material includes a sintered material.

4. The electrical connection element of claim 1, wherein the electrically conductive material includes a brazed material.

5. The electrical connection element of claim 1, wherein the porous material includes a mesh filter for an exhaust system particulate trap.

6. The electrical connection element of claim 1, wherein the electrical connector includes a threaded fastener configured to engage threads on at least one of the first and second conductive plates.

7. The electrical connection element of claim 1, wherein the electrical connector extends through the first conductive plate, the porous material, and the second conductive plate and holds the first conductive plate, the region of the porous material between the first and second conductive plates, and the second conductive plate in compression.

8. The electrical connection element of claim 1, wherein the electrical connector includes a bolt.

9. The electrical connection element of claim 1, wherein at least one of the first and second conductive plates includes stainless steel.

10. The electrical connection element of claim 1, wherein at least one of the first and second conductive plates includes cooling fins.

11. A particulate trap for an exhaust system, comprising:

a housing;

a mesh filter disposed within the housing; and at least one electrical connection element in electrical communication with the mesh filter, wherein the at least one electrical connection element includes:

a first electrically conductive plate disposed on at least a portion of a first side of the mesh filter;

a second electrically conductive plate disposed on at least a portion of a second side of the mesh filter, opposite to the first side;

an electrically conductive material impregnating the mesh filter in a region between the first and second electrically conductive plates; and an electrical connector attached to at least one of the first and second electrically conductive plates.

12. The particulate trap of claim 11, wherein the electrical connector extends through the housing of the particulate trap.

13. The particulate trap of claim 11, wherein the electrically conductive material includes nickel.

14. The particulate trap of claim 11, wherein the electrically conductive material includes a sintered material.

15. The particulate trap of claim 11, wherein the electrically conductive material includes a brazed material.

16. The particulate trap of claim 11, wherein the electrical connector includes a threaded fastener configured to engage threads on at least one of the first and second conductive plates.

17. The particulate trap of claim 11, wherein the electrical connector extends through the first conductive plate, the mesh filter, and the second conductive plate and holds the first conductive plate, the region of the mesh filter between the first and second conductive plates, and the second conductive plate in compression.

18. The particulate trap of claim 11, wherein the region of the mesh filter between the first and second electrically conductive plates impregnated by the electrically conductive material has a volume less than a total volume between the first and second electrically conductive plates.

19. The particulate trap of claim 11, wherein at least one of the first and second conductive plates includes stainless steel.

20. The particulate trap of claim 11, wherein at least one of the first and second conductive plates includes cooling fins.

21. A vehicle exhaust system including the particulate trap of claim 11.

* * * * *